(12) United States Patent
Shaw et al.

(10) Patent No.: US 9,119,041 B2
(45) Date of Patent: Aug. 25, 2015

(54) PERSONAL MEDIA STORAGE AND RETRIEVAL FOR VISUAL VOICE MAIL

(75) Inventors: Venson M. Shaw, Kirkland, WA (US); Gholam-Reza Rahsaz, Sammamish, WA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 273 days.

(21) Appl. No.: 12/946,454

(22) Filed: Nov. 15, 2010

(65) Prior Publication Data

US 2012/0122427 A1   May 17, 2012

(51) Int. Cl.
*H04W 4/12* (2009.01)
*H04M 3/53* (2006.01)
*H04M 1/65* (2006.01)
*H04M 1/725* (2006.01)
*H04W 4/02* (2009.01)

(52) U.S. Cl.
CPC .............. *H04W 4/12* (2013.01); *H04M 3/5307* (2013.01); *H04M 1/6505* (2013.01); *H04M 1/72519* (2013.01); *H04M 2203/253* (2013.01); *H04W 4/02* (2013.01)

(58) Field of Classification Search
CPC ......... H04W 4/12; H04W 4/003; H04W 4/18; H04L 12/589; H04L 51/36; H04M 2203/652; H04M 2203/4509; H04M 2203/4536

USPC ............................ 455/412.2, 413, 414.1, 466
See application file for complete search history.

(56) References Cited

U.S. PATENT DOCUMENTS

| | | | |
|---|---|---|---|
| 7,149,777 B1 * | 12/2006 | Rhee .............................. 709/206 |
| 2006/0268750 A1 * | 11/2006 | Weiner .......................... 370/260 |
| 2008/0207176 A1 * | 8/2008 | Brackbill et al. ............. 455/413 |
| 2009/0022129 A1 * | 1/2009 | Karaoguz et al. ............. 370/338 |
| 2010/0177877 A1 * | 7/2010 | Hamaker et al. ........... 379/88.14 |
| 2010/0278319 A1 * | 11/2010 | Wang et al. ................ 379/88.11 |
| 2011/0092188 A1 * | 4/2011 | Johansson .................. 455/412.2 |
| 2011/0098022 A1 * | 4/2011 | Shaw et al. .................... 455/413 |

FOREIGN PATENT DOCUMENTS

WO   WO 2009029314 A1 *   3/2009
WO   WO 2009040645 A1 *   4/2009

* cited by examiner

*Primary Examiner* — Quan M Hua
(74) *Attorney, Agent, or Firm* — Baker & Hostetler LLP

(57) ABSTRACT

A personal media storage system within a visual voicemail system may be implemented. A visual voicemail server may receive and store multimedia content on a personal media storage system and associate such content with a voicemail. A visual voicemail server may obtain such content if provided with location data for the content rather than the actual content. A visual voicemail client on a wireless device may transmit a request for content to the visual voicemail server, which may retrieve the content and send to the visual voicemail client using the communications link between the visual voicemail client and the visual voicemail server. The visual voicemail client may render the content within the client.

20 Claims, 9 Drawing Sheets

Figure 1 - Prior Art

PERSONAL MEDIA STORAGE AND RETRIEVAL FOR VISUAL VOICE MAIL

TECHNICAL FIELD

The technical field generally relates to wireless communications and more specifically relates to storage and retrieval of multimedia content in a visual voicemail system.

BACKGROUND

Communications devices such as cellular telephones, mobile communication devices, personal digital assistants (PDAs), laptops, and the like are becoming more prevalent as technology advances and makes these devices more powerful and more affordable. These devices are also being constructed with increasing capabilities and can now perform functions that have in the past been performed by dedicated special function communications devices. For instance, a common mobile communications device today may have computing capabilities that allow the device to process multimedia content, the ability to communicate with data networks such as the Internet, a display than can render high quality still images and video, audio capabilities that allow the device to play music and video soundtracks, as well as the ability to place and receive traditional mobile telephone calls and text messages.

The expanding capabilities of mobile communications devices have allowed the improvement and enhancement of more traditional technologies. For example, voicemail has traditionally been an audio-only feature that requires a telephone connection to a voicemail server. Traditionally, a user would receive a message waiting notification that a voicemail is available, and the user would then have to dial into a voicemail server to listen to the message. Thanks to technological advances, visual voicemail is available on many mobile communications devices. Visual voicemail presents a visual interface to a user's voicemail box and allows the user to view attributes of voicemail and manipulate voicemail in various ways that were previously not possible. A user may delete or save voicemail through the visual interface without having to place a telephone call to a voicemail server. A user may also be able to see who the voicemail is from, when it was sent or received, and other characteristic of the voicemail without actually placing a telephone call to a voicemail server. Visual voicemail systems may also provide a means for a sender to include multimedia content to accompany a voice message or to be provided instead of a voice message.

Current visual voicemail services are typically implemented by requesting and establishing a session between a user device and a device in a wireless provider network to obtain visual voicemail data on a user's device. Then, to obtain any additional content, such as a video, song, text message, or any other multimedia content, a separate session must be established between a user's device and the appropriate server or system. For example, as shown in FIG. 1, user's 110 device 111 may, through visual voicemail client 113, establish communications session 153 over network 101 with voicemail server 133 and download visual voicemail data upon receiving a notification of a new available voicemail. Once session 153 is established, voicemail server 133 may communicate with a device 111 and specifically with visual voicemail client 113 transmit voicemail data to visual voicemail client 113. Such data may include an indication that multimedia content associated with a voicemail is available. Communications session 153 that had been used for communicating voicemail data may then be terminated. In order to obtain or otherwise receive the multimedia content, device 111 must then set up another communications session with a appropriate device, such as a content server or a messaging server. For example, in order to access a text message associated with a voicemail, messaging client 114 may be activated on device 111 and establish communications session 154 with messaging server 134. Messaging client 114 may then download, request, or otherwise obtain the associated message from messaging server 134. Similarly, if there is multimedia content associated with a voicemail, in order to access such content, content retrieval client 115 may be activated on device 111 and establish communications session 155 with content server 135. Content retrieval client 114 may then download, request, or otherwise obtain the associated multimedia content from content server 135. Once messages, multimedia content, or other data associated with a voicemail is obtained, such data may be presented to a user on device 111.

There are several drawbacks to the current methods of providing data or content associated with a visual voicemail. Current visual voicemail systems only store visual voicemail content and require a user to obtain associated multimedia content using means outside the visual voicemail system. By requiring separate communications sessions in order to obtain data or content for a single voicemail, utilizing visual voicemail systems may be resource intensive. The user experience may be affected, as the user may be required to interface with several different applications on a device just to obtain the content associated with a single voicemail.

SUMMARY

Systems and methods for a visual voicemail system and a personal media storage system are disclosed. Upon receiving visual voicemail content, a visual voicemail system may be configured to store visual voicemail content on a personal media storage system, associating such content with a visual voicemail and/or a user mailbox. The visual voicemail server may receive a request for the visual voicemail content and retrieve the visual voicemail content from the personal media storage system. The visual voicemail system may then transmit the content to a visual voicemail client using the same communications link used to receive the request for the content.

When a visual voicemail server receives content to be associated with a visual voicemail, the actual content may be received or an indication of a location of the content may be received. If an indication of the content is received, the content may be obtained immediately, or may be obtained after receiving a request from a recipient's visual voicemail client to retrieve the content. In either case, the content may be stored on a personal media storage system and associated with a visual voicemail and/or a user mailbox. The visual voicemail server may be configured to transmit a notification of the visual voicemail content to a visual voicemail client upon receipt of the content, and may be configured to receive a request from the recipient of the content to transmit the content to another user device, and in response, may transmit the content to the other user device.

A wireless device operating a visual voicemail client is disclosed. The visual voicemail client may receive a notification of available visual voicemail content and present such a notification to a user. The visual voicemail client may detect the selection of the content by a user, and may transmit a request for the content to a visual voicemail server over a communications link. The visual voicemail client may receive the content over the communications link and then present the content to the user. These and additional aspects of the current disclosure are set forth in more detail below.

BRIEF DESCRIPTION OF THE DRAWINGS

The following detailed description of preferred embodiments is better understood when read in conjunction with the appended drawings. For the purposes of illustration, there is shown in the drawings exemplary embodiments; however, the subject matter is not limited to the specific elements and instrumentalities disclosed. In the drawings.

DETAILED DESCRIPTION OF ILLUSTRATIVE EMBODIMENTS

Figure 1:
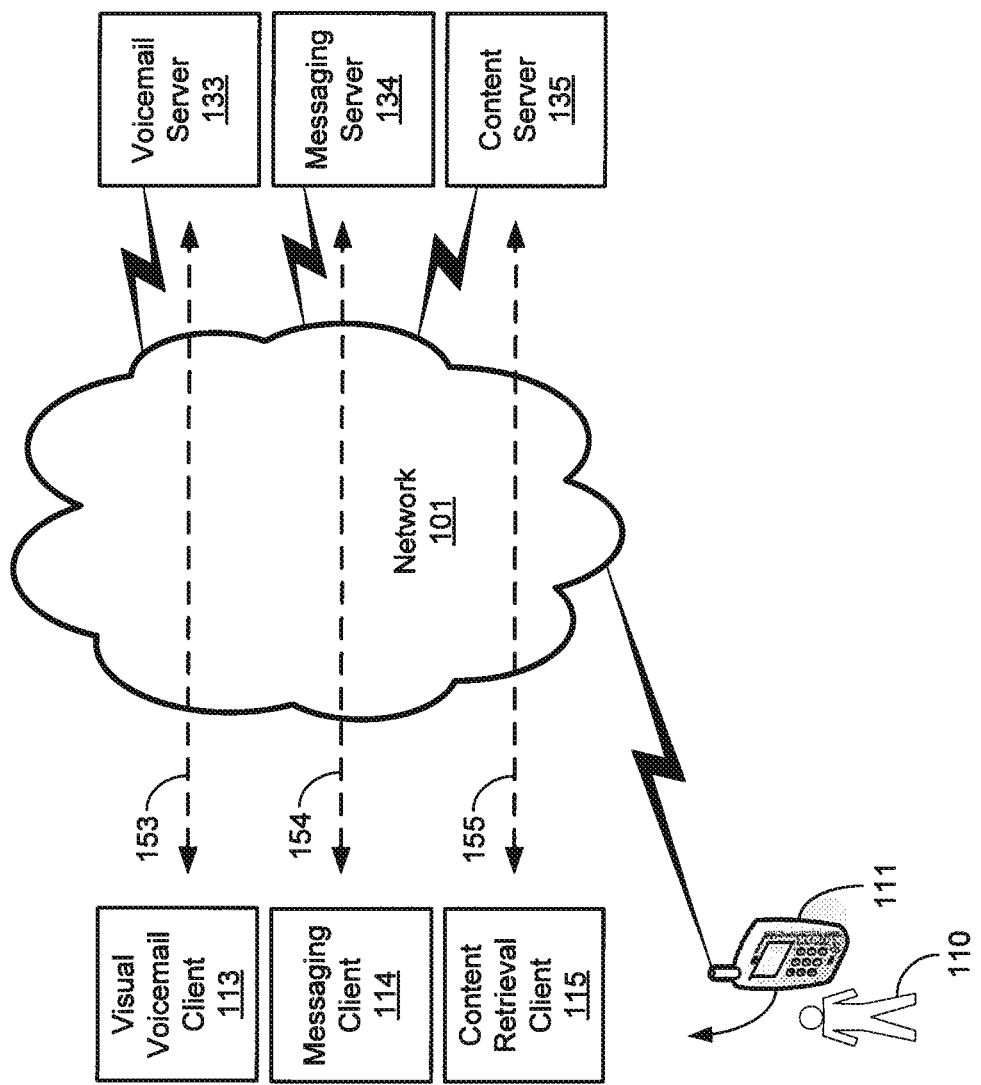
FIG. 1 is a block diagram of a prior art network environment in which traditional visual voicemail data communications take place.
Figure 2:
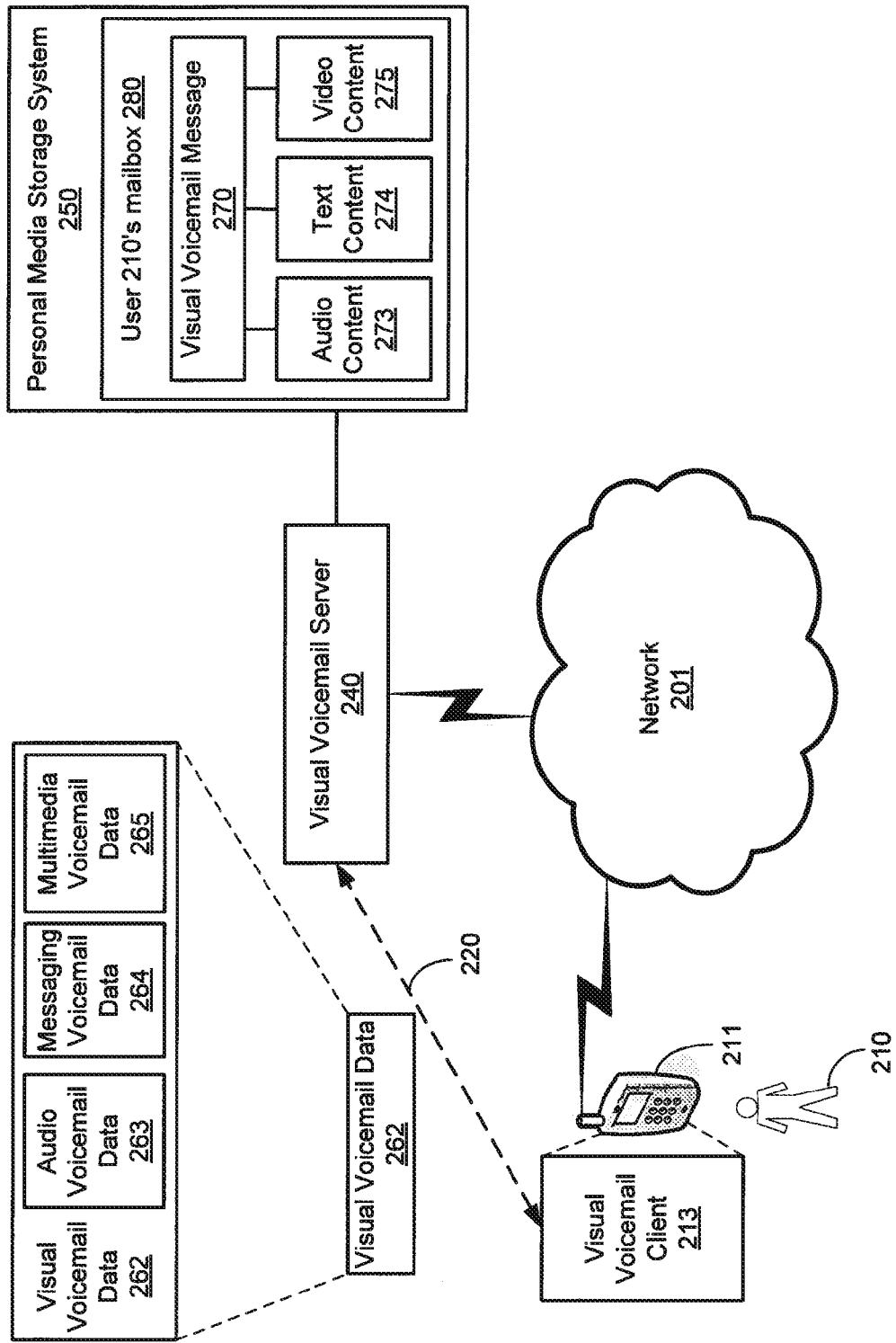
FIG. 2 illustrates a non-limiting exemplary network environment in which personal media storage and retrieval for visual voicemail systems and methods may be implemented.

FIG. 2 illustrates a network environment in which one or more embodiments of an integrated visual voicemail communications system may be implemented. User 210 may operate wireless device 211. Wireless device 211 may be any type of wireless mobile communications device, including a mobile telephone, smart phone, personal data assistant (PDA), mobile computer, wireless email device, or any combination thereof. Alternatively, while wireless device 211 as illustrated may represent one or more of any type of wireless mobile communications devices, wireless device 211 may also represent a wired device, such as a landline telephone, computer, email device, television, or any other communications device or any combination thereof. All such embodiments are contemplated as within the scope of the present disclosure.

Wireless device 211 may communicate with network 201. Network 201 may be any type of network capable of providing wireless services to wireless devices of any type. Network 201 represents single network and any number of interconnected networks that may be composed of any number and type of wired and/or wireless network devices. Network 201 may enable wireless device 211 to communicate with devices accessible via network 201, including other mobile devices. Additionally, network 201 may enable wireless device 211 to communicate with computing devices such as visual voicemail server 240 and other servers accessible via network 201, such as web servers. Such communication may be voice, data, or a combination thereof. All such embodiments are contemplated as within the scope of the present disclosure.

In an embodiment, a notification of a new available voicemail may be sent to wireless device 211 by visual voicemail server 240 or another device over network 201. In response to detecting such a notification, or simply due to user's 210 desire to interact with a visual voicemail system, user 210 may activate and interact with visual voicemail client 213 that may be configured on wireless device 211. Visual voicemail client 213 may be any software, hardware, or combination of software and hardware configured to allow user 210 to interact with a visual voicemail system by operating wireless device 211. Visual voicemail client 213 may be configured to interact with visual voicemail server 240 and/or related systems or components and may merely receive and present visual voicemail message, content, and/or associated multimedia content to user 210 on wireless device 211. Alternatively, visual voicemail client 213 may perform some or all of the processing required to format and present visual voicemail message, content, and/or associated multimedia content to user 210 on wireless device 211. In another alternative, no specialized visual voicemail client may be configured on wireless device 211, and all necessary voicemail data processing may be accomplished through wireless device 211 by visual voicemail server 240 and/or related systems or components. In such a system, the visual voicemail interface presented to user 210 may be web-based (e.g., hosted on a remote device accessible to wireless device via network 201), and may be presented within a webpage displayed on wireless device 211 using appropriate software such as a web browser.

In an embodiment, an exemplary voicemail system including a personal media storage system may be operated, at least in part, by visual voicemail server 240, which may be associated with a network that provides wireless communications services to user 210. Alternatively, visual voicemail server 240 and personal media storage system 250 may be owned, operated, or maintained by a third party, and may be a component of a third party system that provides voicemail services to the operator of network 201 or any other network operator. Visual voicemail server 240 and personal media storage system 250 may each be any one or more computing devices and/or software capable of performing any of the functions described herein. Visual voicemail server 240 may be dedicated to performing voicemail functions, or may be a component of a device or system that performs other functions in addition to voicemail functions. Personal media storage system 250 may be dedicated to performing multimedia storage and retrieval functions, or may be a component of a device or system that performs other functions in addition to multimedia storage and retrieval functions. Visual voicemail server 240 and personal media storage system 250 may be separate devices, or may be combined into a single device (i.e., configured in a single housing.) Alternatively, one or both of visual voicemail server 240 and personal media storage system 250 may be several physical devices communicatively connected such that the functions described herein may be accomplished. All such embodiments are contemplated as within the scope of the present disclosure.

In an embodiment, upon activation and/or instruction from user 210 or wireless device 211, or alternatively in response to receiving instructions from network 201 or any device associated therewith, visual voicemail client 213 may establish communications link 220 with visual voicemail server 240. Any type of communications session may be established, and all means and methods of establishing such a session are contemplated as within the scope of the present disclosure. Once communications link 220 has been established, visual voicemail data 262, for example, associated with visual voicemail message 270, may be provided to visual voicemail client 213. Visual voicemail data 262 may be transmitted automatically by visual voicemail server 240 to visual voicemail client 213 upon establishment of communications link 220, or may be transmitted from visual voicemail server 240 upon receipt of a specific request for such data from visual voicemail client 213. Visual voicemail data 262 may be a notification of a new visual voicemail.

Visual voicemail data 262 may include indicators of content and/or data associated with a voicemail, and/or visual voicemail data 262 may include actual content and/or data associated with a voicemail. For example, as seen in expanded visual voicemail data 262 shown in FIG. 2, visual voicemail data 262 may include audio voicemail data 263, which may be an indicator that visual voicemail message 270 has associated audio content 273. Alternatively, audio voicemail data 263 may include all or part of audio content 273. Note that audio content 273 may be any type of audio content, including a music file, a voice recording (e.g., a voice message associated with visual voicemail message 270) and any other type of data that may be rendered such that it is audible. In an embodiment, audio voicemail data 263 may be audible content that, when played or otherwise activated on wireless device 211, provides an audible indicator of a voice portion of a visual voicemail. In another alternative, audio voicemail data 263 may be actual audible content from a voice portion of a visual voicemail, or a representation thereof. For example, audio voicemail data 263 may be a recording of the first ten seconds of a voice portion of a visual voicemail, or it may be a recording of the entirety of a voice portion of a visual voicemail. Any other audio or audible data or content may be included in audio voicemail data 263, and all such embodiments are contemplated as within the scope of the present disclosure.

Visual voicemail data 262 may also include messaging voicemail data 264. Messaging voicemail data 264 may be portions of or the entirety of text content 274, which may be a text message, instant message, email, or any similar communication. Messaging voicemail data 264 may alternatively be simply an indicator that can be recognized by visual voicemail client 213 indicating that a messaging portion of visual voicemail message 270 exists and may be available. Likewise, visual voicemail data 262 may include multimedia voicemail data 265 that may be portions of or the entirety of one or more pieces of multimedia content, such as video content 275, or it may be simply an indicator that may be recognized by visual voicemail client 213 indicating that a video content 275 or some other multimedia content associated with visual voicemail message 270 exists and may be available.

Visual voicemail message 270 may be generated by visual voicemail server 240 as a result of a user who attempts to contact user 210 at a number or address associated with wireless device 211. Visual voicemail server 240 may receive a request to create visual voicemail message 270 directly from such a user, or from another system communicatively connected to network 201 that, in an embodiment, determines that user 210 is not available via wireless device 211. Such a user may provide typical voicemail content (i.e., a voice recording) and/or multimedia content such as audio content 273, text content 274, video content 275, one or more images, or any other multimedia content. Note that any, all, or none of audio content 273, text content 274, and video content 275 may be included with or associated with visual voicemail message 270, and any other content may in addition, or instead, be included with visual voicemail message 270, and all such embodiments are contemplated as within the scope of the present disclosure.

While in some embodiments, one or all of audio content 273, text content 274, and video content 275 are directly provided by a user requesting or causing the generation of visual voicemail message 270, in other embodiments one or more of audio content 273, text content 274, and video content 275 or some other content associated with visual voicemail message 270 may be provided indirectly. For example, the user providing content for visual voicemail message 270 may provide a link, address, or other identifying information associated with a web site, database, a file server, or other device that may contain all or part of audio content 273, text content 274, and video content 275, or any other content that may be associated with visual voicemail message 270. Any combination of directly provided content and indirectly provided content may be associated with visual voicemail message 270.

In an embodiment, visual voicemail server 240 may proactively obtain, gather, or otherwise access some or all content that has been indirectly provided and is associated with visual voicemail message 270. For example, upon creation of a voicemail, including creation or attachment of messaging data and/or multimedia content, and/or upon transmission of a notification of an available voicemail to wireless device 211, visual voicemail server 240 may gather all such content that has been indirectly provided and store that content with visual voicemail message 270 at personal media storage system 250. Some or all of such content may also be included in visual voicemail data 262 that is transmitted to visual voicemail client 213 and wireless device 211. Alternatively, visual voicemail server 240 may gather indirectly provided content based on user instructions to retrieve, present, or render such content, and may then store such content at personal media storage system 250. Note that visual voicemail server 240 may gather all or portions of indirectly provided content associated with visual voicemail message 270 and manipulate such content data according to user preferences or configurations before transmitting such content and/or data to visual voicemail client 213 and wireless device 211. Any combination of these actions may be performed by visual voicemail server 240, and all such embodiments are contemplated as within the scope of the present disclosure.

While visual voicemail message 270 is being generated by visual voicemail server 240, or after all data and content that is to be part of visual voicemail message 270 is received or obtained by visual voicemail server 240, visual voicemail server 240 may store all content and data associated with visual voicemail message 270 at personal media storage system 250. All content associated with visual voicemail message 270 may be associated with visual voicemail message 270. For example, each of audio content 273, text content 274, and video content 275 may stored at personal media storage system 250 in a database, and a record for each of audio content 273, text content 274, and video content 275 may include a relationship, key, or other indicator of an association with visual voicemail message 270. Thus, data stored at personal media storage system 250 may be organized based on visual voicemail messages. Moreover, visual voicemail message 270 and, in an embodiment, audio content 273, text content 274, and video content 275, may be associated with user 210's mailbox 280. Thus, personal media storage system 250 may organize stored data based on users and visual voicemails. Any organization of personal media storage system 250 is contemplated as within the scope of the present disclosure.

For visual voicemail messages that have content associated therewith that is indirectly provided by a user that caused the visual voicemail message to be generated, visual voicemail server 240 may not be configured to proactively obtain such indirectly provided content. In such an embodiment, visual voicemail data 262 may include only indications of such content. Upon activation by user 210, or due to a configuration of visual voicemail client 213, visual voicemail client may transmit a request for some or all of such indirectly provided content to visual voicemail server 240. In response to such a request, visual voicemail server 240 may then obtain or access some or all of such content and transmit such to visual voicemail client 213 and wireless device 211. In such an embodiment, visual voicemail server 240 may obtain and/or manipulate the data and/or content based on user preferences or configurations. Before, during, or after obtaining and transmitting such content to visual voicemail client 213, visual voicemail server 240 may also store such content at personal media storage system 250 and associate such content with visual voicemail message 270.

Note that in some embodiments, some content and/or data associated with visual voicemail message 270 may be proactively sent to a user device, while other content and/or data associated with visual voicemail message 270 may not be sent to a user device until a request for such data and/or content is received. The determination of which data and/or content to send to a user device proactively and which data and/or content to send to a user device only upon receipt of a request may be made based on visual voicemail server 240 configurations or any other criteria. Similarly, the determination of which data and/or content to obtain and/or store at personal media storage system 250 proactively and which data and/or content to obtain and/or store at personal media storage system 250 only upon receipt of a request to present such content may be made based on visual voicemail client configurations, visual voicemail server 240 configurations, user preferences, or any other criteria. All such embodiments are contemplated as within the scope of the present disclosure.

In order to obtain indirectly provided content to be associated with visual voicemail message 270 at personal media storage system 250, visual voicemail server 240 may communicate with other devices and serve as a central gathering point for such data and/or content. For example, visual voicemail server 240 may request, be proactively sent, or otherwise obtain text content 274 from a messaging server. Similarly, visual voicemail server 240 may request, be proactively sent, or otherwise obtain video content 275 and/or audio content 273 from a multimedia content server. Any other devices, components, or servers may be in communication with visual voicemail server 240 and any of these devices may provide content and/or data associated with a voicemail to visual voicemail server 240. By serving as a central gathering point for voicemail content and related data, visual voicemail server 240 can provide such content and related data to visual voicemail client 213 and wireless device 211 using communications link 220, thus preventing the need for establishing other communications sessions to obtain such content. This reduces the use of network and user device resources.

Upon receiving content and/or data associated with visual voicemail message 270 from visual voicemail server 240 via communications link 220, visual voicemail client 213 may present any such content or data to a user directly rather than establishing a separate communication link to acquire such data and content. Alternatively, visual voicemail client 213 may transmit or otherwise communicate such content and/or data to other components of wireless device 211, but still obtain such content and/or data directly from visual voicemail server 240 via communications link 220. By serving as a primary receiver for voicemail content and related data, visual voicemail client 213 can provide such content and related data to various clients and software on wireless device 211, thus preventing the need for such clients and software to establish other communications sessions to obtain such content. This reduces the use of network and user device resources.

When any content, such as audio content 273, text content 274, and video content 275, associated with visual voicemail message 270 is requested or otherwise to be transmitted to visual voicemail client 213, visual voicemail server 240 may retrieve such content from personal media storage system 250 using any means. For example, visual voicemail server 240 may access files within a database on personal media storage system 250 organized by user mailboxes and/or visual voicemails and locate content associated with visual voicemail message 270. Such content may then be transmitted to wireless device 211 via communications link 220.

In an embodiment, visual voicemail client 213 may render any or all content associated with visual voicemail message 270 itself. For example, visual voicemail client 213 may receive and render or otherwise present audio content 273, text content 274, and/or video content 275 within an interface to visual voicemail client 213 on wireless device 211.

In an embodiment, user 210 may operate visual voicemail client 213 to instruct visual voicemail server 240 to provide some or all of any content associated with visual voicemail message 270 to another user. For example, user 210 may request a "forward" of one or more of audio content 273, text content 274, and video content 275 to another user. In response, visual voicemail server 240 may retrieve the requested content from personal media storage system 250 and transmit it to the specified recipient user.

Figure 3:
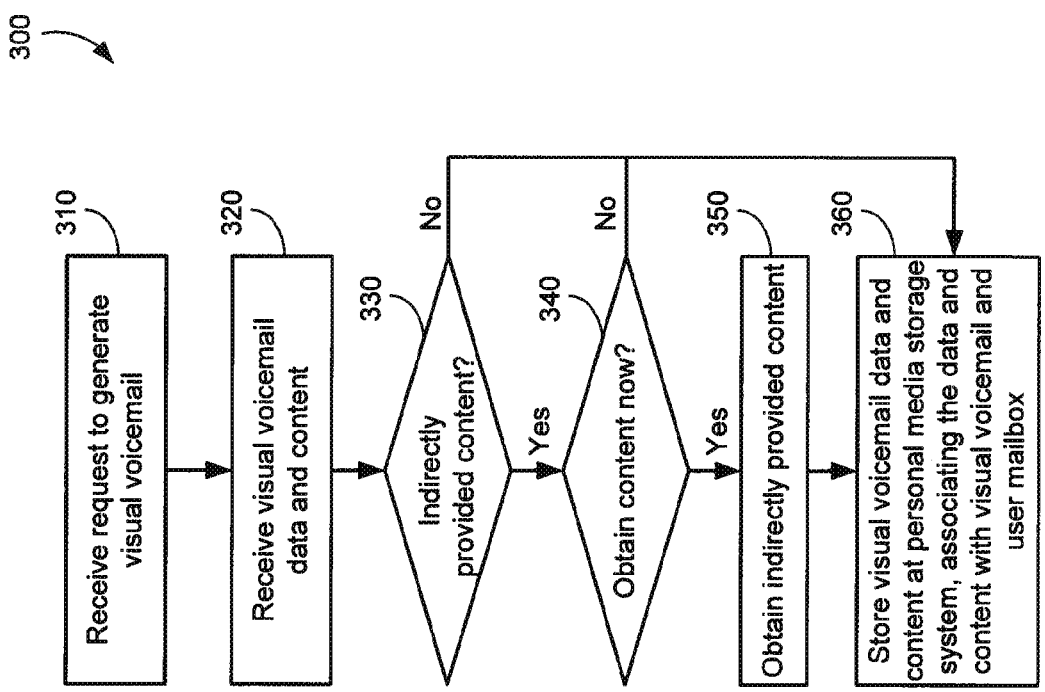
FIG. 3 illustrates a non-limiting exemplary method of implementing an aspect of personal media storage and retrieval system.

FIG. 3 illustrates non-limiting exemplary method 300 of generating and storing visual voicemail data as may be performed by a visual voicemail server, such as visual voicemail server 240. At block 310, a request to generate a visual voicemail may be received. This request may originate at another network device that determined that a user was unable to contact a recipient. For example, a user may have called a recipient, and the recipient failed to answer the call, and therefore a network device may route the call to the visual voicemail server so that a visual voicemail may be created. Note that the visual voicemail server itself may be the requestor of creation of a visual voicemail. Alternatively, a user may operate a visual voicemail client to interact with a visual voicemail server and compose a visual voicemail that may then be transmitted to another visual voicemail server that then generates a visual voicemail for the recipient, which may be simply receiving and storing the composed visual voicemail or performing other processing to create a visual voicemail based on the composed visual voicemail. In another alternative, both the originating user and the recipient may use the same visual voicemail server, and a request to compose a visual voicemail may be the request received at block 310.

At block 320, visual voicemail content and/or data may be received. This may be simply recording a voice message and/or receiving data such as text or video, or this may be involve additional processing of any type. The content may be directly provided by a user, for example recording an audio message, receiving text input, or uploading a content file to the visual voicemail server. Alternatively, the content may be indirectly provided as described above, where a link, address, or some other indicator of the location of the content is provided.

At block 330, a determination may be made as to whether the provided content has been indirectly provided. If not, block 360 may be performed, described in more detail below. If the content has been indirectly provided, at block 340, a determination may be made as to whether the visual voicemail server is to obtain the content now. For example, in some embodiments, a visual voicemail server may be configured to obtain and store any indirectly supplied content immediately upon receiving an indication of the location of such content. Alternatively, in some embodiments, a visual voicemail server may be configured to wait to obtain such content until such content is requested by a recipient. Alternatively, a visual voicemail server may be configured to examine user preferences and determine when to obtain such content based on such preferences. Any such embodiments are contemplated as within the scope of the present disclosure. If the content is not to be obtained now, block 360 may be performed, described in more detail below.

If the indirectly provided content is to be obtained now, at block 350, such content may be obtained. This may include locating the serving device containing such content based on the indirectly provided content data provided by a user and downloading such content. Any other means of obtaining such content may be used.

At block 360, any content received and/or obtained may be stored by the visual voicemail server at a personal media storage system. The visual voicemail server may associate any such content and data with a visual voicemail message, and, in an embodiment, with a user mailbox. Note that the activities in the blocks of method 300 may be performed once per visual voicemail generated, may be performed for each piece of content and/or data associated with a generated visual voicemail, or may be performed for any portion of any piece of content and/or data associated with a generated visual voicemail. All such embodiments are contemplated as within the scope of the present disclosure.

Figure 4:
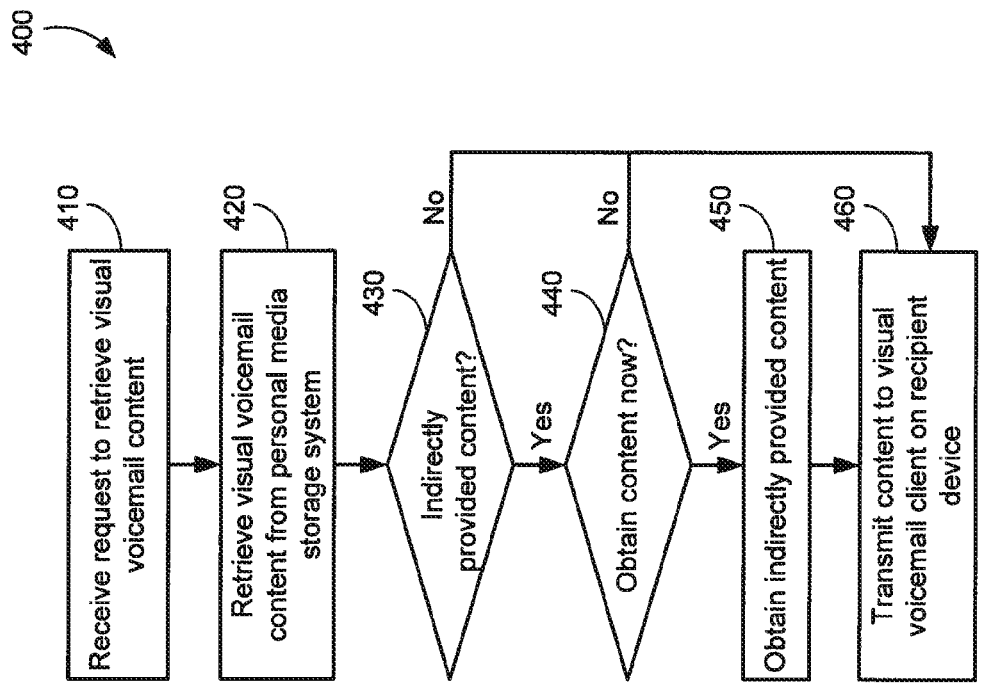
FIG. 4 illustrates another non-limiting exemplary method of implementing an aspect of personal media storage and retrieval system.

FIG. 4 illustrates non-limiting exemplary method 400 of retrieving and transmitting visual voicemail content as may be performed by a visual voicemail server, such as visual voicemail server 240. At block 410, a request to retrieve visual voicemail content may be received. This request may originate at a user device on a visual voicemail client. This request may be in response to a notification of new visual voicemail that was previously transmitted by the visual voicemail server.

At block 420, visual voicemail content may be retrieved. A visual voicemail server may interact with a personal media storage system to obtain content associated with a visual voicemail from the personal media storage system. The visual voicemail server may provide a user name, user mailbox identifier, visual voicemail identifier, and/or any other data to the personal media storage system that may facilitate the locating and providing of visual voicemail content to the visual voicemail server.

At block 430, a determination may be made as to whether the requested content his been indirectly provided. In an embodiment, if the content was originally indirectly provided, but has already been obtained by the visual voicemail server or the personal media storage system, the content will no longer be considered indirectly provided as it is now actually residing on the personal media storage system. If the content has not been, or is no longer, indirectly provided, block 460 may be performed, described in more detail below. If the content has been indirectly provided and remains so, at block 440, a determination may be made as to whether the visual voicemail server is to obtain the content now. For example, in some embodiments, a visual voicemail server may be configured to obtain and store any indirectly supplied content immediately upon receiving a request to provide such content to the intended recipient. Alternatively, in some embodiments, a visual voicemail server may be configured to wait to obtain such content until such content is explicitly requested by a recipient. For example, in response to an initial request for such content, a visual voicemail server may transmit a notice to the requestor that the content was indirectly provided, and may inquire as to whether the requestor would like the content obtained now. In another alternative, a notification of a new voicemail may include information as to whether any of the content was indirectly provided, and may provide options to the recipient to request identifying information about the indirectly provided content or the actual content itself. Alternatively, a visual voicemail server may be configured to examine user preferences and determine when to obtain such content based on such preferences. Any such embodiments are contemplated as within the scope of the present disclosure. If the content is not to be obtained now, block 460 may be performed, described in more detail below.

If the indirectly provided content is to be obtained now, at block 450, such content may be obtained. This may include locating the serving device containing such content based on the indirectly provided content data provided by a user and downloading such content. Any other means of obtaining such content may be used.

At block 460, any content retrieved and/or obtained may be transmitted to the recipient device. Note that the activities in the blocks of method 400 may be performed once per requested piece of visual voicemail content, may be performed at one time for all content associated with a visual voicemail, or may be performed for any portion of any piece of content and/or data associated with a visual voicemail. All such embodiments are contemplated as within the scope of the present disclosure.

Figure 5:
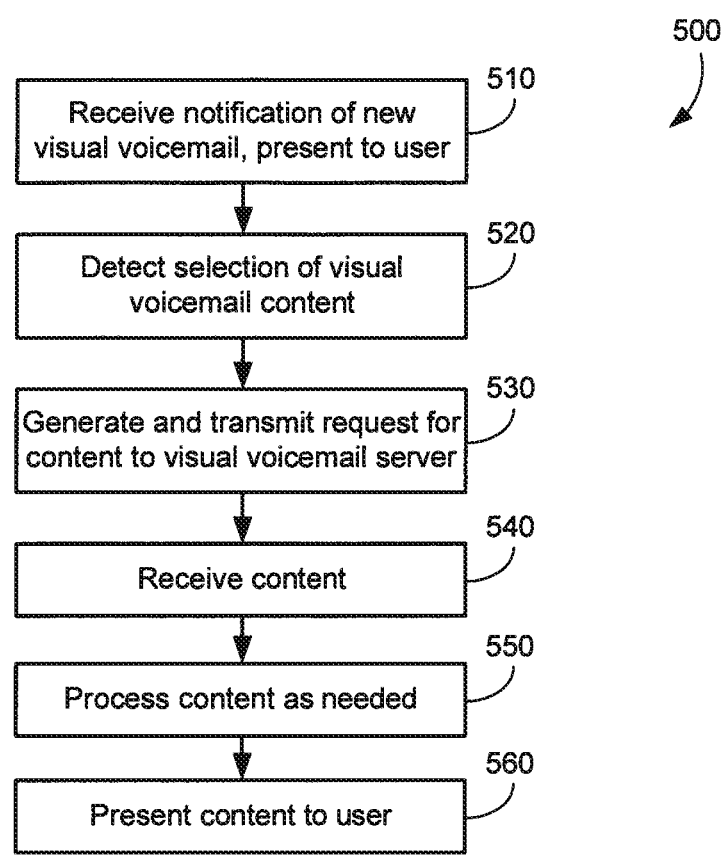
FIG. 5 is illustrates another non-limiting exemplary method of implementing an aspect of personal media storage and retrieval system.

FIG. 5 illustrates non-limiting exemplary method 500 of requesting, receiving, and presenting to a user visual voicemail content as may be performed by a visual voicemail client, such as visual voicemail client 213. At block 510, notification of a new visual voicemail may be received and presented to a user via visual voicemail client. For example, a visual voicemail server may generated a new visual voicemail message or otherwise determine that a visual voicemail message is available for a user, and in response may transmit a notification to a wireless device associated with the user. Note that in some embodiments, a user may simply access a visual voicemail client and request content without necessarily responding to a notification of a new visual voicemail.

At block 520, a selection of visual voicemail content may be detected by the visual voicemail client. This may be any type of selection that may be detected by software, hardware, or a combination thereof (e.g., soft or virtual button activation, hardware button activation, touch screen selection, touch tone detection, etc.)

At block 530, in response to detecting the selection of content, a visual voicemail client may generate and transmit to a visual voicemail server a request for the selected content. This request may include any information that may facilitate the retrieval of such content, including identifying data for a user, a user device, a particular visual voicemail, a visual voicemail client, or any other data.

At block 540, the requested content may be received. At block 550, the content may be processed as needed. In an embodiment, no processing may be performed before presenting content to a user. Alternatively, processing may be performed by a visual voicemail client or other hardware and/or software configured on a user device. For example, high resolution video files may be altered for display on a lower resolution display of a wireless device, or files may be compressed for storage on a storage device of a wireless device. Any processing may be performed, or none at all, and all such embodiments are contemplated as within the scope of the present disclosure.

At block 560, the content may be presented to the user using any means. Note that the activities in the blocks of method 500 may be performed once per piece of visual voicemail content selected, may be performed at one time for all content associated with a visual voicemail, or may be performed for any portion of any piece of content and/or data associated with a visual voicemail. All such embodiments are contemplated as within the scope of the present disclosure.

Note that any of the embodiments described above or elsewhere herein may be combined in any fashion. Any combination of the disclosed embodiments arranged in any configuration may be implemented, and all such embodiments are contemplated as within the scope of the present disclosure.

The methods and systems described above assist in managing communications of all types and increasing ease of use of visual voicemail systems by enabling personal media storage and retrieval. By implementing the present disclosure, the user experience may be improved and network resources may be used more efficiently. Set forth below are exemplary systems, devices, and components in which aspects of the present disclosure may be implemented.

Figure 6:
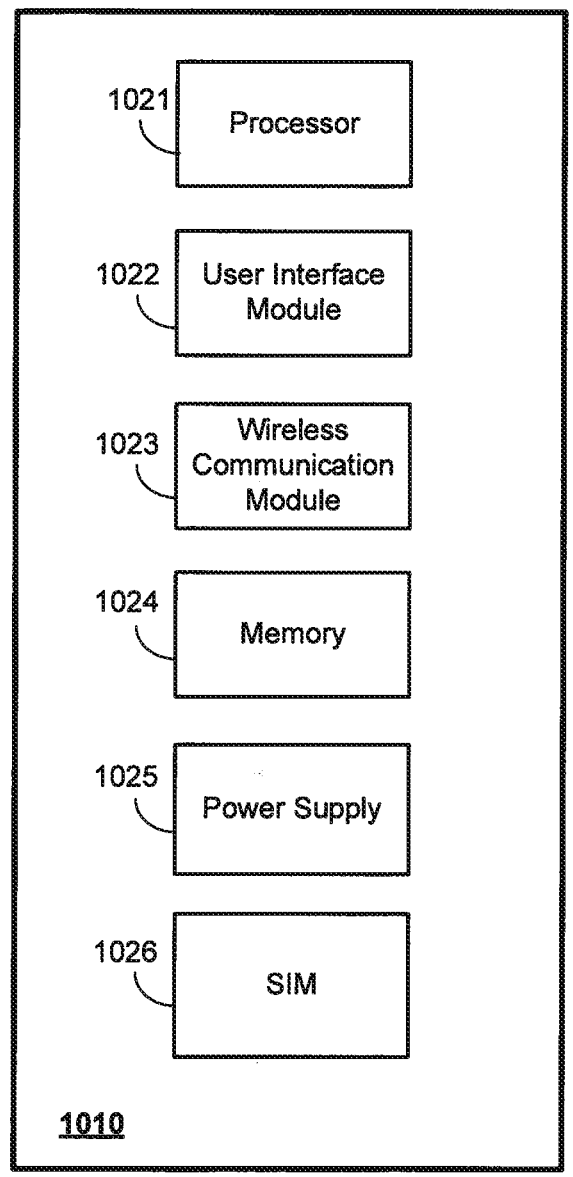
FIG. 6 is a block diagram of a non-limiting, exemplary wireless device that may be used in connection with a personal media storage and retrieval system.

FIG. 6 illustrates an example wireless device 1010 that may be used in connection with an embodiment. References will also be made to other figures of the present disclosure as appropriate. For example, wireless device 211 may be a wireless device of the type described in regard to FIG. 6, and may have some, all, or none of the components and modules described in regard to FIG. 6. It will be appreciated that the components and modules of wireless device 1010 illustrated in FIG. 6 are illustrative, and that any number and type of components and/or modules may be present in wireless device 1010. In addition, the functions performed by any or all of the components and modules illustrated in FIG. 6 may be performed by any number of physical components. Thus, it is possible that in some embodiments the functionality of more than one component and/or module illustrated in FIG. 6 may be performed by any number or types of hardware and/or software.

Processor 1021 may be any type of circuitry that performs operations on behalf of wireless device 1010. In one embodiment, processor 1021 may execute software (i.e., computer readable instructions stored in a computer readable medium) that may include functionality related to personal media storage and retrieval, for example. User interface module 1022 may be any type or combination of hardware and/or software that enables a user to operate and interact with wireless device 1010, and, in one embodiment, to interact with a system or software enabling the user to place, request, and/or receive calls, text communications of any type, visual voicemail, visual voicemail notifications, visual voicemail content and/or data, and/or a system or software enabling the user to view, modify, or delete related software objects. For example, user interface module 1022 may include a display, physical and/or "soft" keys, voice recognition software, microphone, speaker and the like. Wireless communication module 1023 may be any type of transceiver including any combination of hardware and/or software that enables wireless device 1010 to communicate with wireless network equipment, for example, network 201, visual voicemail server 240, and/or any other type of wireless communications network or network equipment. Memory 1024 enables wireless device 1010 to store information, such as visual voicemail content and associated data, multimedia content, software to interact with a visual voicemail system, and visual voicemail system preferences and configurations. Memory 1024 may take any form, such as internal random access memory (RAM), an SD card, a microSD card and the like. Power supply 1025 may be a battery or other type of power input (e.g., a charging cable that is connected to an electrical outlet, etc.) that is capable of powering wireless device 1010. SIM 1026 may be any type Subscriber Identity Module and may be configured on a removable or non-removable SIM card that allows wireless device 1010 to store data on SIM 1026.

Figure 7:
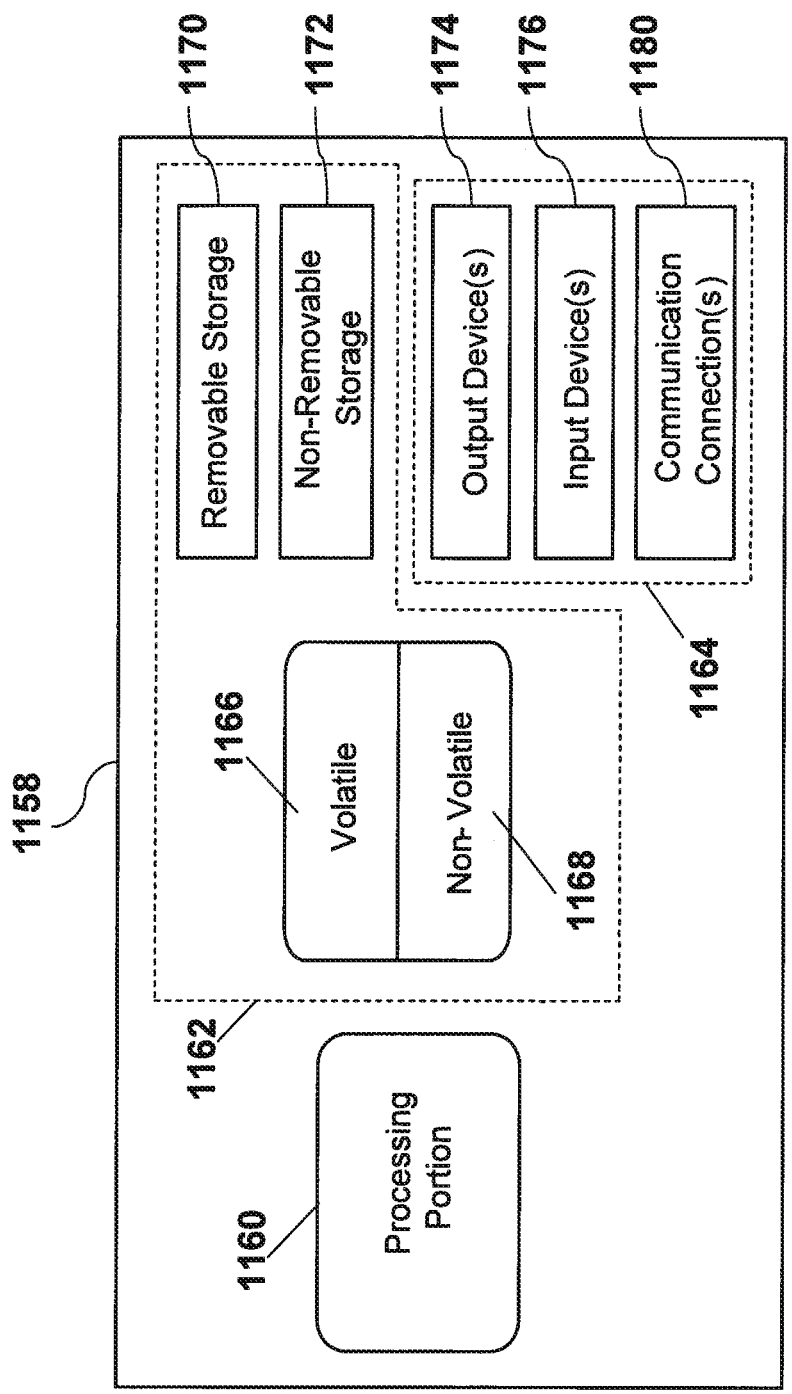
FIG. 7 is a block diagram of a non-limiting, exemplary processor in which a personal media storage and retrieval system may be implemented.

FIG. 7 is a block diagram of an example processor 1158 which may be employed in any of the embodiments described herein, including as one or more components of wireless device 211, as one or more components of network equipment or related equipment, such visual voicemail server 240, personal media storage system 250, and any device that may be part of network 201, and/or as one or more components of any third party system or subsystem that may implement any portion of the subject matter described herein. It is emphasized that the block diagram depicted in FIG. 7 is exemplary and not intended to imply a specific implementation. Thus, the processor 1158 can be implemented in a single processor or multiple processors. Multiple processors can be distributed or centrally located. Multiple processors can communicate wirelessly, via hard wire, or a combination thereof.

As depicted in FIG. 7, the processor 1158 may include a processing portion 1160, a memory portion 1162, and an input/output portion 1164. The processing portion 1160, memory portion 1162, and input/output portion 1164 may be coupled together (coupling not shown in FIG. 7) to allow communications between these portions. The input/output portion 1164 may be capable of providing and/or receiving components, commands, and/or instructions, utilized to, for example, establish and terminate visual voicemail communications sessions, transmit and receive visual voicemail related data, transmit, receive, store and process visual voicemail content and data, execute software to interact with a visual voicemail system and/or a personal media storage and retrieval system, receive and store visual voicemail system preferences and configurations, and/or perform any other function described herein.

The processor 1158 may be implemented as a client processor and/or a server processor. In a basic configuration, the processor 1158 may include at least one processing portion 1160 and memory portion 1162. The memory portion 1162 may store any information utilized in conjunction with transmitting, receiving, and/or processing visual voicemail, visual voicemail-related data and/or content, visual voicemail data, voice calls, other telephonic communications, etc. For example, the memory portion is capable of storing visual voicemail system preferences and/or software capable of processing visual voicemail, operating a visual voicemail client and/or a visual voicemail system and/or a personal media storage and retrieval system, receiving text communications, calls, visual voicemail, multimedia content, visual voicemail applications, etc. Depending upon the exact configuration and type of processor, the memory portion 1162 may be volatile (such as RAM) 1166, non-volatile (such as ROM, flash memory, etc.) 1168, or a combination thereof. The processor 1158 may have additional features/functionality. For example, the processor 1158 may include additional storage (removable storage 1170 and/or non-removable storage 1172) including, but not limited to, magnetic or optical disks, tape, flash, smart cards or a combination thereof. Computer storage media, such as memory and storage elements 1162, 1170, 1172, 1166, and 1168, may include volatile and non-volatile, removable and non-removable media implemented in any method or technology for storage of information such as computer readable instructions, data structures, program modules, or other data. Computer storage media may include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, universal serial bus (USB) compatible memory, smart cards, or any other medium that can be used to store the desired information and which can be accessed by the processor 1158. Any such computer storage media may be part of the processor 1158.

The processor 1158 may also contain the communications connection(s) 1180 that allow the processor 1158 to communicate with other devices, for example through network 201 as illustrated in FIG. 2. Communications connection(s) 1180 is an example of communication media. Communication media typically embody computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media may include wired media such as a wired network or direct-wired connection as might be used with a land line telephone, and wireless media such as acoustic, RF, infrared, cellular, and other wireless media. The term computer-readable media as used herein includes both storage media and communication media. The processor 1158 may also have input device(s) 1176 such as keyboard, keypad, mouse, pen, voice input device, touch input device, etc. Output device(s) 1174 such as a display, speakers, printer, etc. also may be included.

Network 201 illustrated in FIG. 2 may comprise any appropriate telephony radio network, or any other type of communications network, wireline or wireless, or any combination thereof. The following description sets forth some exemplary telephony radio networks, such as the global system for mobile communications (GSM), and non-limiting operating environments. The below-described operating environments should be considered non-exhaustive, however, and thus the below-described network architectures merely show how a visual voicemail system with a personal media storage and retrieval system may be implemented with stationary and non-stationary network structures and architectures in order to provide personal media storage and retrieval. It will be appreciated, however, that personal media storage and retrieval systems such as those described herein may be incorporated with existing and/or future alternative architectures for communication networks as well.

The GSM is one of the most widely utilized wireless access systems in today's fast growing communication environment. The GSM provides circuit-switched data services to subscribers, such as mobile telephone or computer users. The General Packet Radio Service (GPRS), which is an extension to GSM technology, introduces packet switching to GSM networks. The GPRS uses a packet-based wireless communication technology to transfer high and low speed data and signaling in an efficient manner. The GPRS attempts to optimize the use of network and radio resources, thus enabling the cost effective and efficient use of GSM network resources for packet mode applications.

The exemplary GSM/GPRS environment and services described herein also may be extended to 3G services, such as Universal Mobile Telephone System (UMTS), Frequency Division Duplexing (FDD) and Time Division Duplexing (TDD), High Speed Packet Data Access (HSPDA), cdma2000 1x Evolution Data Optimized (EVDO), Code Division Multiple Access-2000 (cdma2000 3x), Time Division Synchronous Code Division Multiple Access (TD-SCDMA), Wideband Code Division Multiple Access (WCDMA), Enhanced Data GSM Environment (EDGE), International Mobile Telecommunications-2000 (IMT-2000), Digital Enhanced Cordless Telecommunications (DECT), 4G Services such as Long Term Evolution (LTE), Long Term Evolution Advanced (LTE-A), etc., as well as to any other network services. In this regard, the systems and methods for personal media storage and retrieval may be applied independently of the method of data transport, and may not depend on any particular network architecture or underlying protocols.

Figure 8:
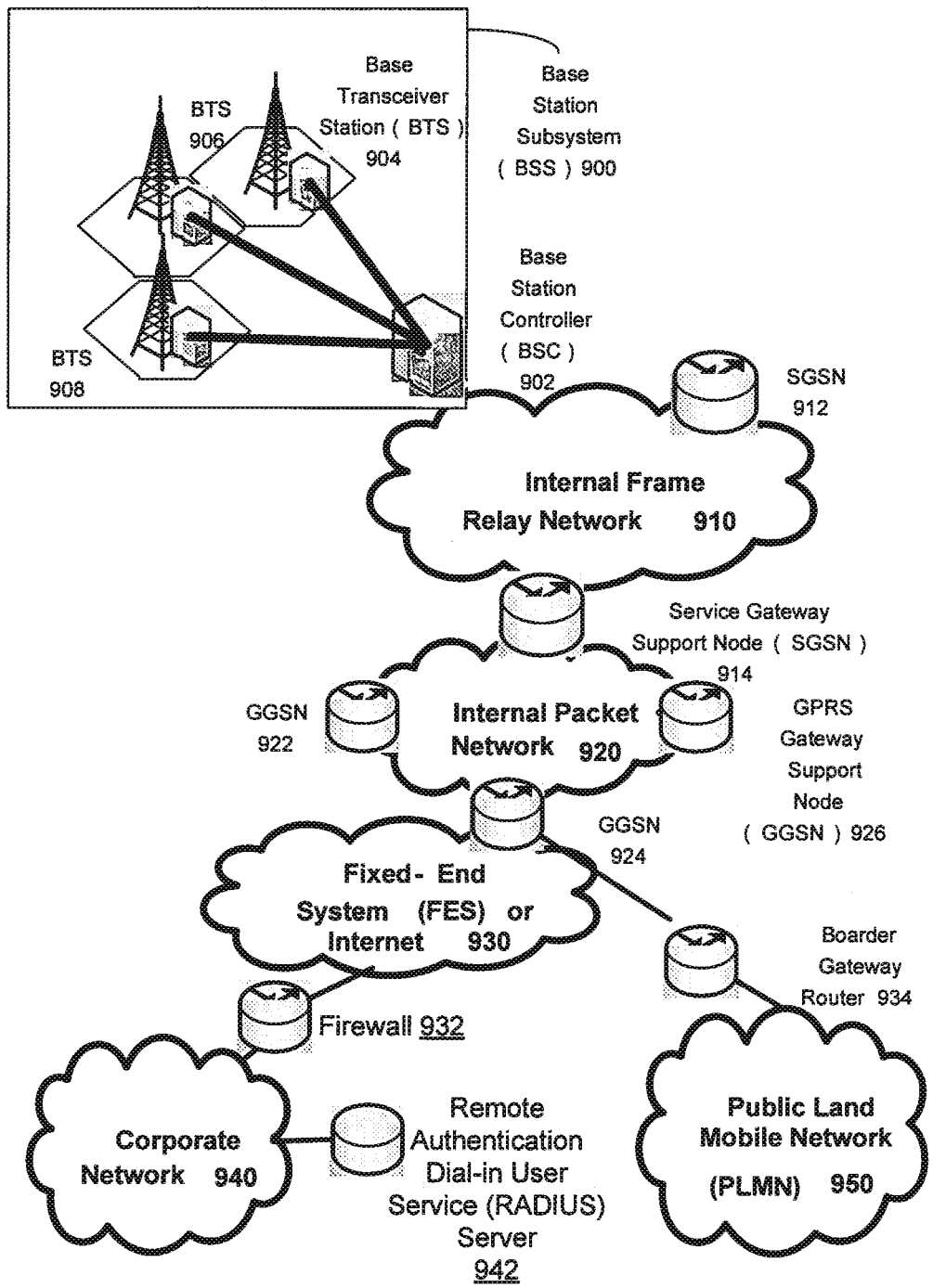
FIG. 8 is a block diagram of an exemplary packet-based mobile cellular network environment, such as a GPRS network, in which integrated a personal media storage and retrieval system may be implemented.

FIG. 8 depicts an overall block diagram of an exemplary packet-based mobile cellular network environment, such as a GPRS network, in which the systems and methods for personal media storage and retrieval such as those described herein can be practiced. In an example configuration, network 201 as illustrated in FIG. 2 may be encompassed by or interact with the network environment depicted in FIG. 8. Similarly, wireless device 211 may communicate or interact with a network environment such as that depicted in FIG. 8. In such an environment, there may be a plurality of Base Station Subsystems (BSS) 900 (only one is shown), each of which comprises a Base Station Controller (BSC) 902 serving a plurality of Base Transceiver Stations (BTS) such as BTSs 904, 906, and 908. BTSs 904, 906, 908, etc. may be the access points where users of packet-based mobile devices (e.g., wireless device 211) become connected to the wireless network. In exemplary fashion, the packet traffic originating from user devices (e.g., wireless device 211) may be transported via an over-the-air interface to a BTS 908, and from the BTS 908 to the BSC 902. Base station subsystems, such as BSS 900, may be a part of internal frame relay network 910 that can include Service GPRS Support Nodes (SGSN) such as SGSN 912 and 914. Each SGSN may be connected to an internal packet network 920 through which a SGSN 912, 914, etc. may route data packets to and from a plurality of gateway GPRS support nodes (GGSN) 922, 924, 926, etc. As illustrated, SGSN 914 and GGSNs 922, 924, and 926 may be part of internal packet network 920. Gateway GPRS serving nodes 922, 924 and 926 may provide an interface to external Internet Protocol (IP) networks, such as Public Land Mobile Network (PLMN) 950, corporate intranets 940, or Fixed-End System (FES) or the public Internet 930. As illustrated, subscriber corporate network 940 may be connected to GGSN 924 via firewall 932, and PLMN 950 may be connected to GGSN 924 via border gateway router 934. The Remote Authentication Dial-In User Service (RADIUS) server 942 may be used for caller authentication when a user of a mobile cellular device calls corporate network 940.

Generally, there may be four different cell sizes in a GSM network, referred to as macro, micro, pico, and umbrella cells. The coverage area of each cell may be different in different environments. Macro cells may be regarded as cells in which the base station antenna is installed in a mast or a building above average roof top level. Micro cells may be cells whose antenna height is under average roof top level. Micro-cells may be typically used in urban areas. Pico cells are small cells having a diameter of a few dozen meters. Pico cells may be used mainly indoors. On the other hand, umbrella cells may be used to cover shadowed regions of smaller cells and fill in gaps in coverage between those cells.

Figure 9:
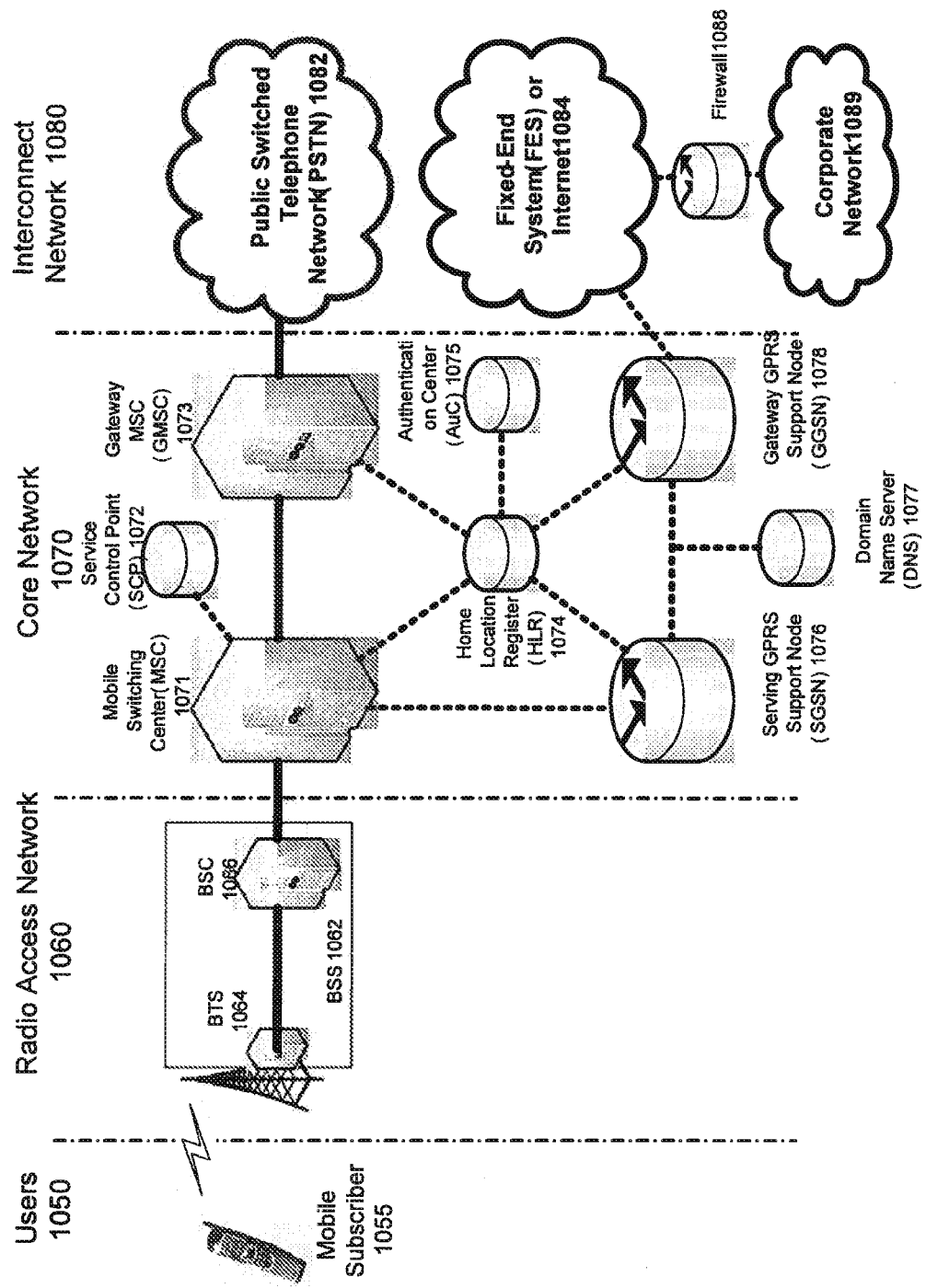
FIG. 9 illustrates a non-limiting, exemplary architecture of a typical GPRS network in which a personal media storage and retrieval system may be implemented.

FIG. 9 illustrates an architecture of a typical GPRS network segmented into four groups: users 1050, radio access network 1060, core network 1070, and interconnect network 1080. Users 1050 may comprise a plurality of end users (though only mobile subscriber 1055 is shown in FIG. 9). In an example embodiment, the device depicted as mobile subscriber 1055 may include wireless device 211. Radio access network 1060 may include a plurality of base station subsystems such as BSSs 1062, which include BTSs 1064 and BSCs 1066. Core network 1070 may include a host of various network elements. As illustrated here, core network 1070 may include Mobile Switching Center (MSC) 1071, Service Control Point (SCP) 1072, gateway MSC 1073, SGSN 1076, Home Location Register (HLR) 1074, Authentication Center (AuC) 1075, Domain Name Server (DNS) 1077, and GGSN 1078. Interconnect network 1080 may also include a host of various networks and other network elements. As illustrated in FIG. 9, interconnect network 1080 may include Public Switched Telephone Network (PSTN) 1082, Fixed-End System (FES) or Internet 1084, firewall 1088, and/or Corporate Network 1089.

A mobile switching center may be connected to a large number of base station controllers. At MSC 1071, for instance, depending on the type of traffic, the traffic may be separated in that voice may be sent to Public Switched Telephone Network (PSTN) 1082 through Gateway MSC (GMSC) 1073, and/or data may be sent to SGSN 1076, which may send the data traffic to GGSN 1078 for further forwarding.

When MSC 1071 receives call traffic, for example, from BSC 1066, it may send a query to a database hosted by SCP 1072. The SCP 1072 may process the request and may issue a response to MSC 1071 so that it may continue call processing as appropriate.

The HLR 1074 may be a centralized database for users to register to the GPRS network. HLR 1074 may store static information about the subscribers such as the International Mobile Subscriber Identity (IMSI), subscribed services, and a key for authenticating the subscriber. HLR 1074 may also store dynamic subscriber information such as the current location of the mobile subscriber. HLR 1074 may also serve to intercept and determine the validity of destination numbers in messages sent from a device, such as mobile subscriber 1055, as described herein. Associated with HLR 1074 may be AuC 1075. AuC 1075 may be a database that contains the algorithms for authenticating subscribers and may include the associated keys for encryption to safeguard the user input for authentication.

In the following, depending on context, the term "mobile subscriber" may refer to the end user or may refer to the actual portable device, such as wireless device 211, used by an end user of a mobile cellular service or a wireless provider. When a mobile subscriber turns on his or her mobile device, the mobile device may go through an attach process by which the mobile device attaches to an SGSN of the GPRS network. In FIG. 9, when mobile subscriber 1055 initiates the attach process by turning on the network capabilities of the mobile device, an attach request may be sent by mobile subscriber 1055 to SGSN 1076. The SGSN 1076 queries another SGSN, to which mobile subscriber 1055 was attached before, for the identity of mobile subscriber 1055. Upon receiving the identity of mobile subscriber 1055 from the other SGSN, SGSN 1076 may request more information from mobile subscriber 1055. This information may be used to authenticate mobile subscriber 1055 to SGSN 1076 by HLR 1074. Once verified, SGSN 1076 may send a location update to HLR 1074 indicating the change of location to a new SGSN, in this case SGSN 1076. HLR 1074 may notify the old SGSN, to which mobile subscriber 1055 may have been attached before, to cancel the location process for mobile subscriber 1055. HLR 1074 may then notify SGSN 1076 that the location update has been performed. At this time, SGSN 1076 may send an Attach Accept message to mobile subscriber 1055, which in turn sends an Attach Complete message to SGSN 1076.

After attaching itself with the network, mobile subscriber 1055 may then go through the authentication process. In the authentication process, SGSN 1076 may send the authentication information to HLR 1074, which may send information back to SGSN 1076 based on the user profile that was part of the user's initial setup. The SGSN 1076 may then send a request for authentication and ciphering to mobile subscriber 1055. The mobile subscriber 1055 may use an algorithm to send the user identification (ID) and password to SGSN 1076. The SGSN 1076 may use the same algorithm and compares the result. If a match occurs, SGSN 1076 authenticates mobile subscriber 1055.

Next, the mobile subscriber 1055 may establish a user session with the destination network, corporate network 1089, by going through a Packet Data Protocol (PDP) activation process. Briefly, in the process, mobile subscriber 1055 may request access to the Access Point Name (APN), for example, UPS.com, and SGSN 1076 may receive the activation request from mobile subscriber 1055. SGSN 1076 may then initiate a Domain Name Service (DNS) query to learn which GGSN node has access to the UPS.com APN. The DNS query may be sent to the DNS server within the core network 1070, such as DNS 1077, that may be provisioned to map to one or more GGSN nodes in the core network 1070. Based on the APN, the mapped GGSN 1078 may access the requested corporate network 1089. The SGSN 1076 may then send to GGSN 1078 a Create Packet Data Protocol (PDP) Context Request message that contains necessary information. The GGSN 1078 may send a Create PDP Context Response message to SGSN 1076, which may then send an Activate PDP Context Accept message to mobile subscriber 1055.

Once activated, data packets of the call made by mobile subscriber 1055 may then go through radio access network 1060, core network 1070, and interconnect network 1080, in a particular fixed-end system, or Internet 1084 and firewall 1088, to reach corporate network 1089.

Thus, network elements that may invoke the functionality of a personal media storage and retrieval system such as those described herein may include but are not limited to Gateway GPRS Support Node tables, Fixed End System router tables, firewall systems, VPN tunnels, and any number of other network elements as required by the particular digital network.

Figure 10:
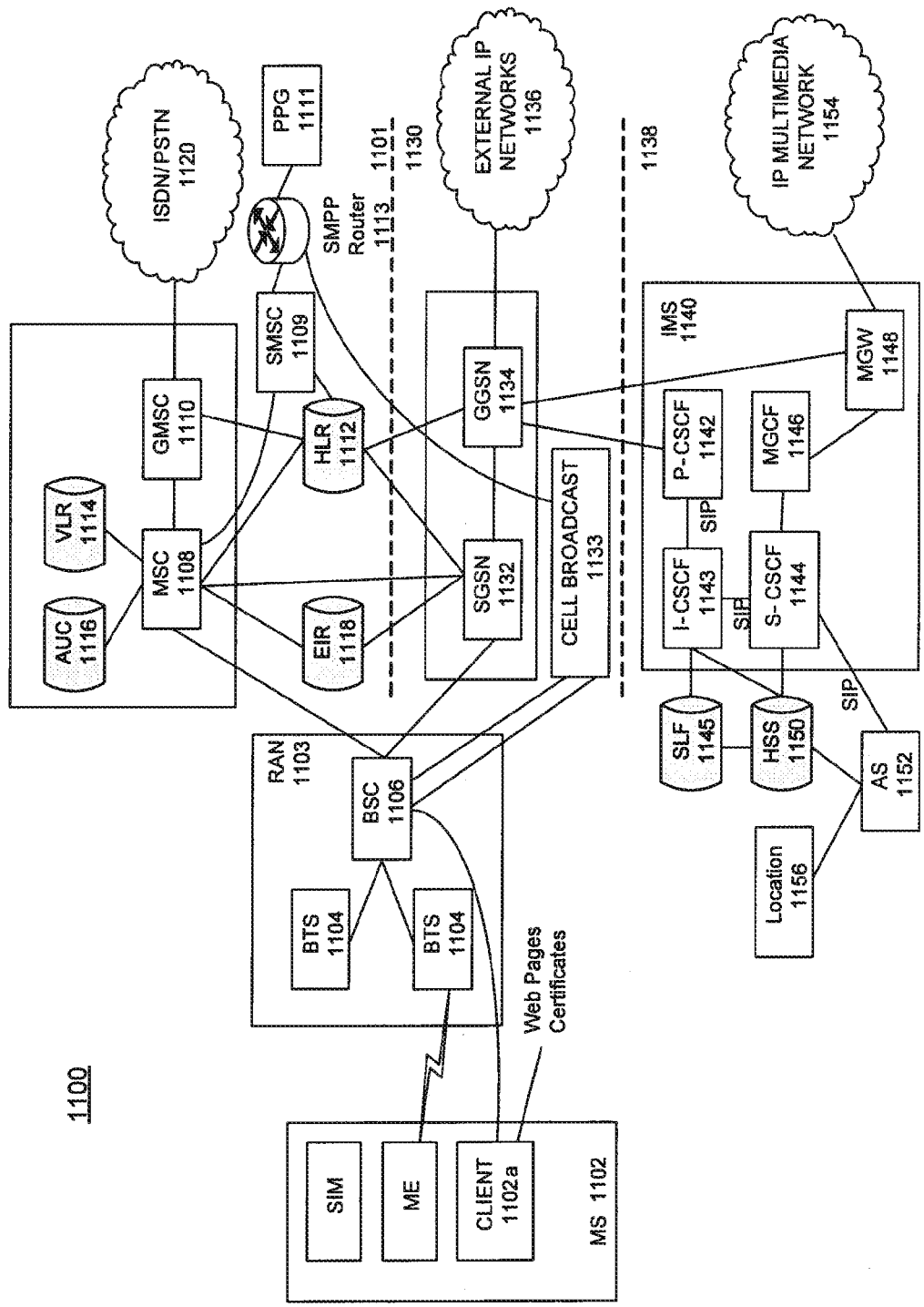
FIG. 10 illustrates a non-limiting alternate block diagram of an exemplary GSM/GPRS/IP multimedia network architecture in which a personal media storage and retrieval system may be implemented.

FIG. 10 illustrates another exemplary block diagram view of a GSM/GPRS/IP multimedia network architecture 1100 in which the systems and methods for personal media storage and retrieval such as those described herein may be incorporated. As illustrated, architecture 1100 of FIG. 10 includes a GSM core network 1101, a GPRS network 1130 and an IP multimedia network 1138. The GSM core network 1101 includes a Mobile Station (MS) 1102, at least one Base Transceiver Station (BTS) 1104 and a Base Station Controller (BSC) 1106. The MS 1102 is physical equipment or Mobile Equipment (ME), such as a mobile telephone or a laptop computer (e.g., wireless device 211) that may be used by mobile subscribers, in one embodiment with a Subscriber identity Module (SIM). The SIM may include an International Mobile Subscriber Identity (IMSI), which may be a unique identifier of a subscriber. The BTS 1104 may be physical equipment, such as a radio tower, that enables a radio interface to communicate with the MS. Each BTS may serve more than one MS. The BSC 1106 may manage radio resources, including the BTS. The BSC may be connected to several BTSs. The BSC and BTS components, in combination, may be generally referred to as a base station (BSS) or radio access network (RAN) 1103.

The GSM core network 1101 may also include a Mobile Switching Center (MSC) 1108, a Gateway Mobile Switching Center (GMSC) 1110, a Home Location Register (HLR) 1112, Visitor Location Register (VLR) 1114, an Authentication Center (AuC) 1118, and an Equipment Identity Register (EIR) 1116. The MSC 1108 may perform a switching function for the network. The MSC may also perform other functions, such as registration, authentication, location updating, handovers, and call routing. The GMSC 1110 may provide a gateway between the GSM network and other networks, such as an Integrated Services Digital Network (ISDN) or Public Switched Telephone Networks (PSTNs) 1120. Thus, the GMSC 1110 may provide interworking functionality with external networks.

The HLR 1112 may be a database that may contain administrative information regarding each subscriber registered in a corresponding GSM network. The HLR 1112 may also contain the current location of each MS. The VLR 1114 may be a database that contains selected administrative information from the HLR 1112. The VLR may contain information necessary for call control and provision of subscribed services for each MS currently located in a geographical area controlled by the VLR. The HLR 1112 and the VLR 1114, together with the MSC 1108, may provide the call routing and roaming capabilities of GSM. The AuC 1116 may provide the parameters needed for authentication and encryption functions. Such parameters may allow verification of a subscriber's identity. The EIR 1118 may store security-sensitive information about the mobile equipment.

A Short Message Service Center (SMSC) 1109 may allow one-to-one short message service (SMS), or multimedia message service (MMS), messages to be sent to/from the MS 1102. A Push Proxy Gateway (PPG) 1111 may be used to "push" (i.e., send without a synchronous request) content to the MS 1102. The PPG 1111 may act as a proxy between wired and wireless networks to facilitate pushing of data to the MS 1102. A Short Message Peer to Peer (SMPP) protocol router 1113 may be provided to convert SMS-based SMPP messages to cell broadcast messages. SMPP may be a protocol for exchanging SMS messages between SMS peer entities such as short message service centers. The SMPP protocol may be used to allow third parties (e.g., content suppliers such as news organizations) to submit bulk messages.

To gain access to GSM services, such as voice, data, short message service (SMS), and multimedia message service (MMS), the MS may first register with the network to indicate its current location by performing a location update and IMSI attach procedure. MS 1102 may send a location update including its current location information to the MSC/VLR, via BTS 1104 and BSC 1106. The location information may then be sent to the MS's HLR. The HLR may be updated with the location information received from the MSC/VLR. The location update may also be performed when the MS moves to a new location area. Typically, the location update may be periodically performed to update the database as location updating events occur.

GPRS network 1130 may be logically implemented on the GSM core network architecture by introducing two packet-switching network nodes, a serving GPRS support node (SGSN) 1132, a cell broadcast and a Gateway GPRS support node (GGSN) 1134. The SGSN 1132 may be at the same hierarchical level as the MSC 1108 in the GSM network. The SGSN may control the connection between the GPRS network and the MS 1102. The SGSN may also keep track of individual MS's locations and security functions and access controls.

Cell Broadcast Center (CBC) 1133 may communicate cell broadcast messages that are typically delivered to multiple users in a specified area. Cell Broadcast is one-to-many geographically focused service. It may enable messages to be communicated to multiple mobile telephone customers who are located within a given part of its network coverage area at the time the message is broadcast.

GGSN 1134 may provide a gateway between the GPRS network and a public packet network (PDN) or other IP networks 1136. That is, the GGSN may provide interworking functionality with external networks, and may set up a logical link to the MS through the SGSN. When packet-switched data leaves the GPRS network, it may be transferred to an external TCP-IP network 1136, such as an X.25 network or the Internet. In order to access GPRS services, the MS may first attach itself to the GPRS network by performing an attach procedure. The MS may then activate a packet data protocol (PDP) context, thus activating a packet communication session between the MS, the SGSN, and the GGSN.

In a GSM/GPRS network, GPRS services and GSM services may be used in parallel. The MS may operate in one three classes: class A, class B, and class C. A class A MS may attach to the network for both GPRS services and GSM services simultaneously. A class A MS may also support simultaneous operation of GPRS services and GSM services. For example, class A mobiles may receive GSM voice/data/SMS calls and GPRS data calls at the same time.

A class B MS may attach to the network for both GPRS services and GSM services simultaneously. However, a class B MS may not support simultaneous operation of the GPRS services and GSM services. That is, a class B MS may only use one of the two services at a given time.

A class C MS may attach for only one of the GPRS services and GSM services at a time. Simultaneous attachment and operation of GPRS services and GSM services may not be possible with a class C MS.

GPRS network 1130 may be designed to operate in three network operation modes (NOM1, NOM2 and NOM3). A network operation mode of a GPRS network may be indicated by a parameter in system information messages transmitted within a cell. The system information messages may direct an MS where to listen for paging messages and how to signal towards the network. The network operation mode may represent the capabilities of the GPRS network. In a NOM1 network, an MS may receive pages from a circuit switched domain (voice call) when engaged in a data call. The MS may suspend the data call or take both simultaneously, depending on the ability of the MS. In a NOM2 network, an MS may not receive pages from a circuit switched domain when engaged in a data call, since the MS is receiving data and is not listening to a paging channel. In a NOM3 network, an MS may monitor pages for a circuit switched network while receiving data and vice versa.

The IP multimedia network 1138 was introduced with 3GPP Release 5, and may include IP multimedia subsystem (IMS) 1140 to provide rich multimedia services to end users. A representative set of the network entities within IMS 1140 may be a call/session control function (CSCF), a media gateway control function (MGCF) 1146, a media gateway (MGW) 1148, and a master subscriber database, called a home subscriber server (HSS) 1150. HSS 1150 may be common to GSM core network 1101, GPRS network 1130 as well as IP multimedia network 1138.

IP multimedia system 1140 may be built around the call/session control function, of which there are three types: an interrogating CSCF (I-CSCF) 1143, a proxy CSCF (P-CSCF) 1142, and a serving CSCF (S-CSCF) 1144. The P-CSCF 1142 may be the MS's first point of contact with the IMS 1140. The P-CSCF 1142 may forward session initiation protocol (SIP) messages received from the MS to an SIP server in a home network (and vice versa) of the MS. The P-CSCF 1142 may also modify an outgoing request according to a set of rules defined by the network operator (for example, address analysis and potential modification).

I-CSCF 1143 may form an entrance to a home network and may hide the inner topology of the home network from other networks. I-CSCF 1143 may provide flexibility for selecting an S-CSCF. I-CSCF 1143 may contact subscriber location function (SLF) 1145 to determine which HSS 1150 to use for the particular subscriber, if multiple HSSs 1150 are present. S-CSCF 1144 may perform the session control services for MS 1102. This includes routing originating sessions to external networks and routing terminating sessions to visited networks. S-CSCF 1144 may also decide whether an application server (AS) 1152 is required to receive information on an incoming SIP session request to ensure appropriate service handling. This decision is based on information received from HSS 1150 (or other sources, such as application server 1152). AS 1152 may also communicate to location server 1156 (e.g., a Gateway Mobile Location Center (GMLC)) that provides a position (e.g., latitude/longitude coordinates) of MS 1102.

HSS 1150 may contain a subscriber profile and keep track of which core network node is currently handling the subscriber. It may also support subscriber authentication and authorization functions (AAA). In networks with more than one HSS 1150, a subscriber location function may provide information on the HSS 1150 that contains the profile of a given subscriber.

MGCF 1146 may provide interworking functionality between SIP session control signaling from the IMS 1140 and ISUP/BICC call control signaling from the external GSTN networks (not shown.) It may also control the media gateway (MGW) 1148 that provides user-plane interworking functionality (e.g., converting between AMR- and PCM-coded voice.) MGW 1148 may also communicate with other IP multimedia networks 1154.

Push to Talk over Cellular (PoC) capable mobile telephones may register with the wireless network when the telephones are in a predefined area (e.g., job site, etc.) When the mobile telephones leave the area, they may register with the network in their new location as being outside the pre-defined area. This registration, however, may not indicate the actual physical location of the mobile telephones outside the pre-defined area.

While example embodiments of systems and methods for personal media storage and retrieval have been described in connection with various communications devices and computing devices/processors, the underlying concepts may be applied to any communications or computing device, processor, or system capable of implementing the personal media storage and retrieval systems and methods described. The various techniques described herein may be implemented in connection with hardware or software or, where appropriate, with a combination of both. Thus, the methods and apparatuses for personal media storage and retrieval, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for personal media storage and retrieval. In the case of program code execution on programmable computers, the computing device will generally include a processor, a storage medium readable by the processor (including volatile and non-volatile memory and/or storage elements), at least one input device, and at least one output device. The program(s) can be implemented in assembly or machine language, if desired. The language can be a compiled or interpreted language, and combined with hardware implementations.

Methods and systems for personal media storage and retrieval may also be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like, the machine may become an apparatus for personal media storage and retrieval. When implemented on a general-purpose processor, the program code may combine with the processor to provide an apparatus that operates to invoke the functionality of personal media storage and retrieval as described herein. Additionally, any storage techniques used in connection with a personal media storage and retrieval system may invariably be a combination of hardware and software.

While personal media storage and retrieval system and methods have been described in connection with the various embodiments of the various figures, it is to be understood that other similar embodiments may be used or modifications and additions may be made to the described embodiments for performing the same function of personal media storage and retrieval without deviating therefrom. For example, one skilled in the art will recognize that personal media storage and retrieval as described in the present application may apply to any environment, whether wired or wireless, and may be applied to any number of such devices connected via a communications network and interacting across the network. Therefore, personal media storage and retrieval should not be limited to any single embodiment, but rather should be construed in breadth and scope in accordance with the appended claims.

What is claimed is:

1. A visual voicemail system comprising:
   a memory comprising executable instructions; and
   a processor coupled to the memory that, when executing the instructions, effectuates operations comprising:
   receiving multimedia content location data for indirectly provided multimedia content associated with a visual voicemail message;
   determining a user preference has been set for obtaining, without additional input from the user, indirectly provided multimedia content associated with visual voicemail messages;
   responsive to determining the user preference for obtaining, without additional input from the user, indirectly provided multimedia content associated with visual voicemail messages has been set, automatically obtaining the indirectly provided multimedia content associated with the visual voicemail message from a remote device based on the multimedia content location data;

transmitting the indirectly provided multimedia content associated with the visual voicemail message to a personal media storage system;

receiving a request for the indirectly provided multimedia content associated with the visual voicemail message from a visual voicemail client on a recipient device;

retrieving the indirectly provided multimedia content associated with the visual voicemail message from the personal media storage system; and transmitting the indirectly provided multimedia content associated with the visual voicemail message to the visual voicemail client on the recipient device.

2. The visual voicemail system of claim 1, wherein the request for the multimedia content associated with the visual voicemail message is generated by a selection of an indicator of the multimedia content associated with the visual voicemail message presented in the visual voicemail client on the recipient device.

3. The visual voicemail system of claim 1, wherein the operation of transmitting the multimedia content associated with the visual voicemail message to the visual voicemail client on the recipient device comprises transmitting a portion of the multimedia content associated with the visual voicemail message to the visual voicemail client on the recipient device.

4. The visual voicemail system of claim 1, wherein the operations further comprise:

receive a second request for second multimedia content associated with the visual voicemail message from a visual voicemail client on a recipient device;

retrieve second multimedia content location data from the personal media storage system; and obtain the second multimedia content associated with the visual voicemail message from a remote device based on the second multimedia content location data.

5. The visual voicemail system of claim 1, wherein the operation of transmitting the multimedia content associated with the visual voicemail message to the personal media storage system comprises transmitting an instruction to the personal media storage system to associate the multimedia content associated with the visual voicemail message with the visual voicemail message.

6. The visual voicemail system of claim 1, wherein the operations further comprise transmitting a notification of the visual voicemail message to the visual voicemail client on the recipient device.

7. The visual voicemail system of claim 1, wherein the multimedia content comprises at least one of audio content, text content, or video content.

8. The visual voicemail system of claim 1, wherein the operations further comprise:

receiving a request from the recipient device to transmit the multimedia content associated with the visual voicemail message to a second device;

retrieving the multimedia content associated with the visual voicemail message from the personal media storage system; and transmitting the multimedia content associated with the visual voicemail message to the second device.

9. A method comprising:

receiving multimedia content location data for indirectly provided multimedia content associated with a visual voicemail message at a visual voicemail server communicatively connected to a personal media storage system;

determining a user preference has been set for proactively obtaining, without additional input from the user, indirectly provided multimedia content associated with visual voicemail messages;

responsive to determining the user preference for proactively obtaining, without additional input from the user, indirectly provided multimedia content associated with visual voicemail messages has been set, automatically obtaining the indirectly provided multimedia content associated with the visual voicemail message from a remote device based on the multimedia content location data;

storing the indirectly provided multimedia content associated with the visual voicemail message at the personal media storage system;

receiving a request for the indirectly provided multimedia content associated with the visual voicemail message from a visual voicemail client on a recipient device;

retrieving the indirectly provided multimedia content associated with the visual voicemail message from the personal media storage system; and transmitting the indirectly provided multimedia content associated with the visual voicemail message to the visual voicemail client on the recipient device.

10. The method of claim 9, wherein the request for the multimedia content associated with the visual voicemail message is generated by a selection of an indicator of the multimedia content associated with the visual voicemail message presented in the visual voicemail client on the recipient device.

11. The method of claim 9, wherein transmitting the multimedia content associated with the visual voicemail message to the visual voicemail client on the recipient device comprises transmitting a portion of the multimedia content associated with the visual voicemail message to the visual voicemail client on the recipient device.

12. The method of claim 9, further comprising:

receiving a second request for second multimedia content associated with the visual voicemail message from a visual voicemail client on a recipient device;

retrieving second multimedia content location data from the personal media storage system; and obtaining the second multimedia content associated with the visual voicemail message from a remote device based on the second multimedia content location data.

13. The method of claim 9, wherein storing the multimedia content associated with the visual voicemail message at the personal media storage system comprises associating the multimedia content associated with the visual voicemail message with the visual voicemail message.

14. The method of claim 9, further comprising transmitting a notification of the visual voicemail message to the visual voicemail client on the recipient device.

15. The method of claim 9, wherein the multimedia content comprises at least one of audio content, text content, or video content.

16. The method of claim 9, further comprising:

receiving a request from the recipient device to transmit the multimedia content associated with the visual voicemail message to a second device;

retrieving the multimedia content associated with the visual voicemail message from the personal media storage system; and transmitting the multimedia content associated with the visual voicemail message to the second device.

17. A tangible computer-readable memory device having stored thereon computer-executable instructions that, when executed by a processor, effectuate operations comprising:

receiving multimedia content location data for indirectly provided multimedia content associated with a visual voicemail message at a visual voicemail server communicatively connected to a personal media storage system;

determining a user preference has been set for proactively obtaining, without additional input from the user, indirectly provided multimedia content associated with visual voicemail messages;

responsive to determining the user preference for proactively obtaining, without additional input from the user, indirectly provided multimedia content associated with visual voicemail messages has been set, automatically obtaining the indirectly provided multimedia content associated with the visual voicemail message from a remote device based on the multimedia content location data;

storing the indirectly provided multimedia content associated with the visual voicemail message at the personal media storage system;

receiving a request for the indirectly provided multimedia content associated with the visual voicemail message from a visual voicemail client on a recipient device;

retrieving the indirectly provided multimedia content associated with the visual voicemail message from the personal media storage system; and transmitting the indirectly provided multimedia content associated with the visual voicemail message to the visual voicemail client on the recipient device.

18. The tangible computer-readable memory device of claim 17, wherein transmitting the multimedia content associated with the visual voicemail message to the visual voicemail client on the recipient device comprises transmitting a portion of the multimedia content associated with the visual voicemail message to the visual voicemail client on the recipient device.

19. The tangible computer-readable memory device of claim 17, wherein the operations further comprise:

receiving a second request for second multimedia content associated with the visual voicemail message from a visual voicemail client on a recipient device;

retrieving second multimedia content location data from the personal media storage system; and obtaining the second multimedia content associated with the visual voicemail message from a remote device based on the second multimedia content location data.

20. The tangible computer-readable memory device of claim 17, wherein the operations further comprise transmitting a notification of the visual voicemail message to the visual voicemail client on the recipient device.

* * * * *